United States Patent [19]

Snyder

[11] Patent Number: 5,379,847
[45] Date of Patent: Jan. 10, 1995

[54] TRI-FOLD ROW MARKER
[75] Inventor: Michael D. Snyder, Bettendorf, Iowa
[73] Assignee: Deere & Company, Moline, Ill.
[21] Appl. No.: 111,370
[22] Filed: Aug. 24, 1993
[51] Int. Cl.$^6$ .............................................. A01B 69/02
[52] U.S. Cl. .................... 172/128; 172/126; 172/456
[58] Field of Search ............... 172/126, 127, 128, 129, 172/130, 131, 132, 311, 456; 298/22 R, 22 P, 22 B

[56] References Cited

U.S. PATENT DOCUMENTS

| | | | |
|---|---|---|---|
| 3,666,019 | 5/1972 | Yeske | 172/130 |
| 4,030,551 | 6/1977 | Boetto et al. | 172/126 |
| 4,207,950 | 6/1980 | Kinzenbaw | 172/126 |
| 4,449,590 | 5/1984 | Williamson | 172/126 |
| 4,530,405 | 7/1985 | White | 172/126 |
| 4,986,367 | 1/1991 | Kinzenbaw | 172/126 |

Primary Examiner—Randolph A. Reese
Assistant Examiner—Christopher J. Novosad

[57] ABSTRACT

A tri-fold row marker comprises three arm segments, a winglet pivotally coupled to the toolbar, an inner arm pivotally coupled to the winglet, and an outer arm pivotally coupled to the inner arm. A marker disc is mounted to the distal end of the outer arm for marking the ground surface when said row marker is its extended working position. The winglet is provided with a first bell crank extending upwardly from the winglet and a second bell crank extending downwardly from the winglet. The inner arm is provided with a third bell crank extending downwardly therefrom. A double acting hydraulic cylinder is pivotally coupled to the agricultural implement and the first bell crank for retracting and extending the row marker. An inner control arm is pivotally coupled to the agricultural implement and the third bell crank for pivoting the inner arm relative to the winglet when the hydraulic cylinder is extended or retracted. An outer control arm is pivotally coupled to the second bell crank. The outer control arm is also coupled to the inner and outer arms by two pivot links that are pivotally coupled to the outer control arm and the inner and outer arms. The outer control arm pivots the outer arm relative to the inner arm when the hydraulic cylinder is extended or retracted. Retracting the hydraulic cylinder from its extended position folds the marker arm into its retracted transport position, and extending the hydraulic cylinder from its retracted position unfolds the marker arm into its extended working position.

5 Claims, 4 Drawing Sheets

TRI-FOLD ROW MARKER

BACKGROUND OF THE INVENTION

1. Field of the Invention

The invention is directed to a tri-fold row marker having three sections that are pivotally coupled to one another. The row marker has an extended working position and a retracted transport position.

2. Description of the Prior Art

Row markers are commonly attached to agricultural implements, such as planters and grain drills, to mark the field for the farmer's next pass. As implements have become wider row markers have become longer. The longer row markers have folded transport positions and extended working positions.

Bi-fold row markers have two pivot points, see U.S. Pat. No. 4,530,405. In the patent identified above, the bi-fold marker has an inner arm that is pivotally mounted to the planter toolbar and an outer arm that is pivotally coupled to the inner arm. A hydraulic cylinder manipulates the inner arm into and out of its horizontal working position and vertical transport position. The outer arm is extended by a cable that is coupled between the outer arm and the toolbar. As the hydraulic cylinder pivots the inner arm from its vertical transport position to its horizontal working position, the cable extends the outer arm so that it is in line with the inner arm when the row marker is in its working position.

As agricultural implements became wider tri-fold markers were developed having three pivot points, see U.S. Pat. Nos. 4,207,950, 4,449,590 and 4,986,367. In all three above-identified tri-fold designs, a single hydraulic cylinder is used to manipulate the folding and unfolding action of the row marker. In the first two designs, U.S. Pat. Nos. 4,207,950 and 4,449,590, a cable or chain is used to extend the outer arm during an unfolding operation in a manner similar to the above discussed bi-fold row marker. The cable or chain does not control the movement of the outer arm during the folding cycle, creating a high kinetic impact when the outer arm engages a stop located on the inner arm. In the third design, U.S. Pat. No. 4,986,367, a control arm is used to extend the outer arm.

SUMMARY

It is one of the objects of the present invention to provide a row marker that simultaneously folds the arm segments in a quick and smooth folding motion, reducing accelerations and kinetic impact caused by a change in the direction of travel and center of rotation.

It is a feature of the present invention that the outer control arm is located below the outer and inner arms when the row marker is in its extended working position, thereby minimizing the maximum height of the row marker during the fold cycle.

It is another feature of the present invention that the marker itself moves vertically into and away from the ground rather than sliding horizontally along the ground as it is being extended and retracted.

It is another object of the present invention that the hydraulic cylinder that extends and retracts the row marker is located and operated to minimize its exposure to the environment.

It is another feature of the present invention that the hydraulic cylinder is located above the winglet away from the dirt when the marker arm is in its extended working position, and is protected by being folded inside the arm when the marker arm is in its retracted transport position.

It is another feature of the present invention that the hydraulic cylinder is retracted when the row marker is in its retracted transport position, thereby protecting the cylinder rod from damaging weather during extended periods of storage.

The present invention comprises a tri-fold row marker for an agricultural implement. The row marker comprises three sections, a winglet pivotally coupled to the toolbar, an inner arm pivotally coupled to the winglet, and an outer arm pivotally coupled to the inner arm. A surface marking means comprising a marker disc is mounted to the distal end of the outer arm for marking the ground surface when said row marker is its extended working position.

The winglet is provided with a first bell crank extending upwardly from the winglet and a second bell crank extending downwardly from the winglet. The inner arm is provided with a third bell crank extending downwardly therefrom. A hydraulic cylinder is pivotally coupled to the agricultural implement and the first bell crank for retracting and extending the row marker. An inner control arm is pivotally coupled to the agricultural implement and the third bell crank for pivoting the inner arm relative to the winglet when the hydraulic cylinder is extended or retracted. An outer control arm is pivotally coupled to the second bell crank. The outer control arm is also coupled to the inner and outer arms by two pivot links that are pivotally coupled to the outer control arm and the inner and outer arms. The outer control arm pivots the outer arm relative to the inner arm when the hydraulic cylinder is extended or retracted. Retracting the hydraulic cylinder from its extended position folds the marker arm into its retracted transport position, and extending the hydraulic cylinder from its retracted position unfolds the marker arm into its extended working position.

The inner control arm is pivotally coupled to the toolbar by a float slot. The hydraulic cylinder is pivotally coupled to the toolbar by a spring biassed toggle link. The float slot and toggle link allow the row marker to float up and down with the contours of the ground to a limited degree. In its extended working position the outer arm is kept rigid with the inner arm by an outer stop positioned between the inner arm and outer arm. The upward force of the marker disc pushes the outer arm upwardly so that the outer stop locks against the inner arm. The upper motion of the marker disc is transmitted through the outer control arm to lock the inner arm against the winglet.

DETAILED DESCRIPTION

Figure 1:
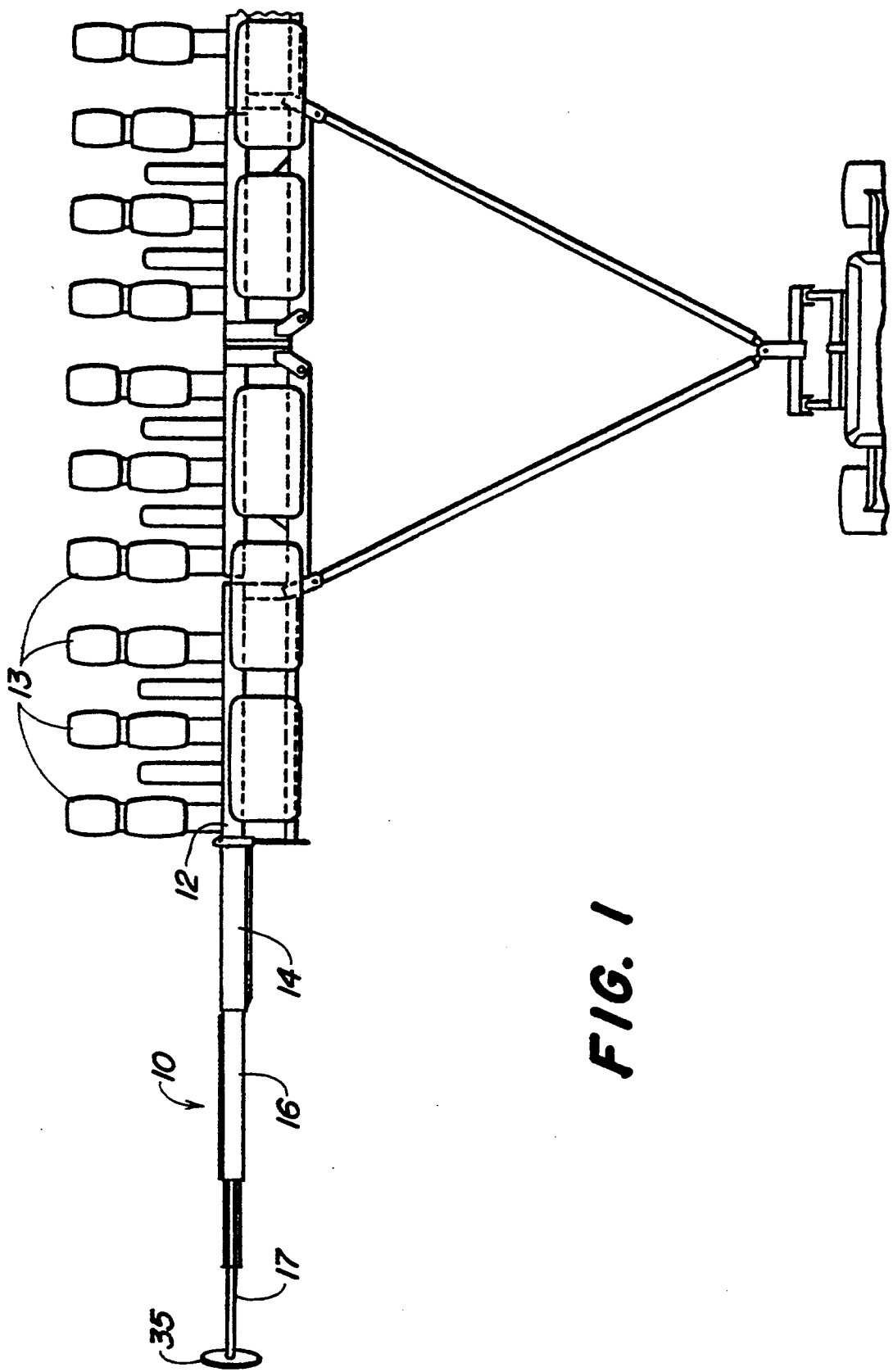
FIG. 1 is an overhead view of an agricultural planter having a tri-fold marker of the present invention.

Tri-fold row marker 10 of the present invention is mounted to the end of toolbar 12. The toolbar is provided with a number of planting units 13. It should be noted the toolbar carry a variety of agricultural implements, such as a grain drill or a sprayer unit.

The row marker comprises three arm segments, a winglet 14, an inner arm 16 and an outer arm 17. The winglet 14 has a first end 18 and a second end 20. The first end is pivotally coupled to the toolbar 12 by a winglet mounting bracket 24, best illustrated in FIGS. 4 and 5. The inner arm 16 has a first end 26 and a second end 28. The first end 26 of the inner arm 16 is pivotally coupled to the second end 20 of winglet 14 at 29. Similarly the outer arm 17 has a first end 30 and a second end 32. The first end 30 of the outer arm 17 is pivotally coupled to the second end 28 of the inner arm 16 at 33. The second end 32 is provided with a surface marking means comprising a marker disc 35 that is rotatably mounted to the outer arm.

It should be noted that the second end 32 of the outer arm 17 would be provided with an extension tube to which the marker disc 35 would be secured. The extension tube allows the operator to make minor length adjustments for different sized machines and to satisfy personal preferences as to marker location.

Figure 3:
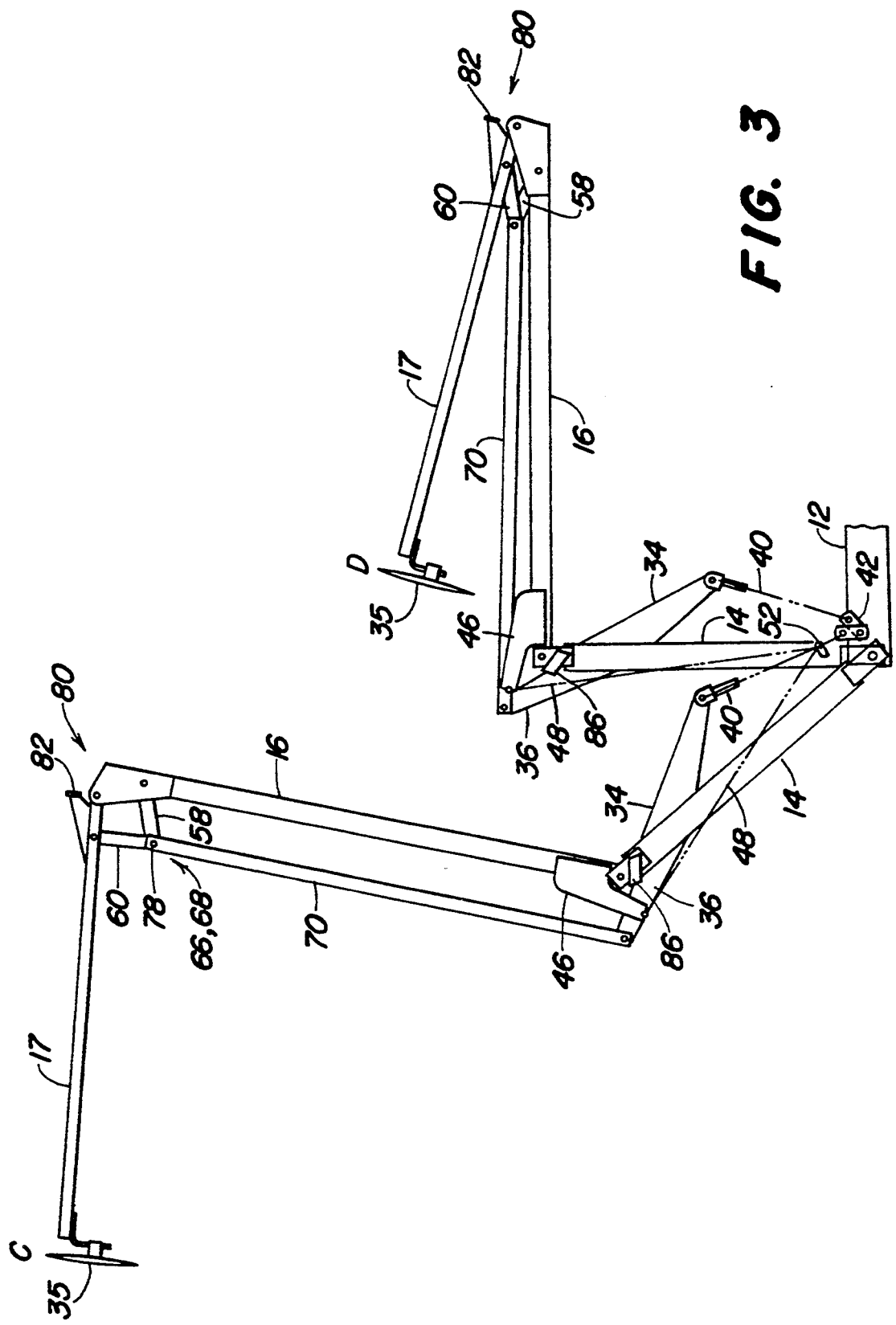
FIG. 3 is a front view of the present invention in its folded transport position and an intermediate fold position.
Figure 4:
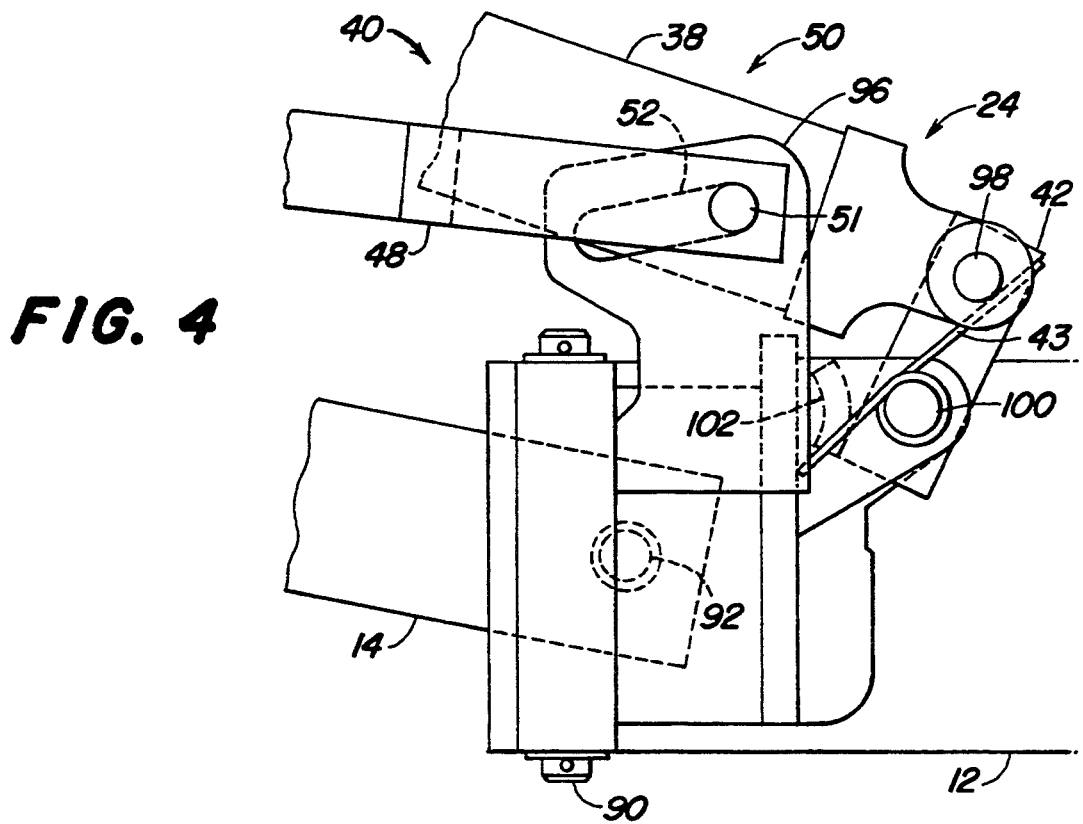
FIG. 4 is a partial front view of the winglet mounting bracket when the row marker is at its uppermost float position.

The winglet 14 is provided with a first bell crank 34 and a second bell crank 36. The cylinder portion 38 of a double acting hydraulic cylinder 40 is pivotally coupled to the toolbar by a toggle link 42. The piston rod end 44 of the hydraulic cylinder is pivotally coupled to the first bell crank 34. By extending or retracting the hydraulic cylinder the winglet is pivoted relative to the toolbar. The toggle link is biassed outwardly from the toolbar by torsion spring 43. The hydraulic cylinder 40 is best illustrated in FIGS. 4 and 5, only its location is identified in FIGS. 2 and 3 for clarity.

Figure 5:
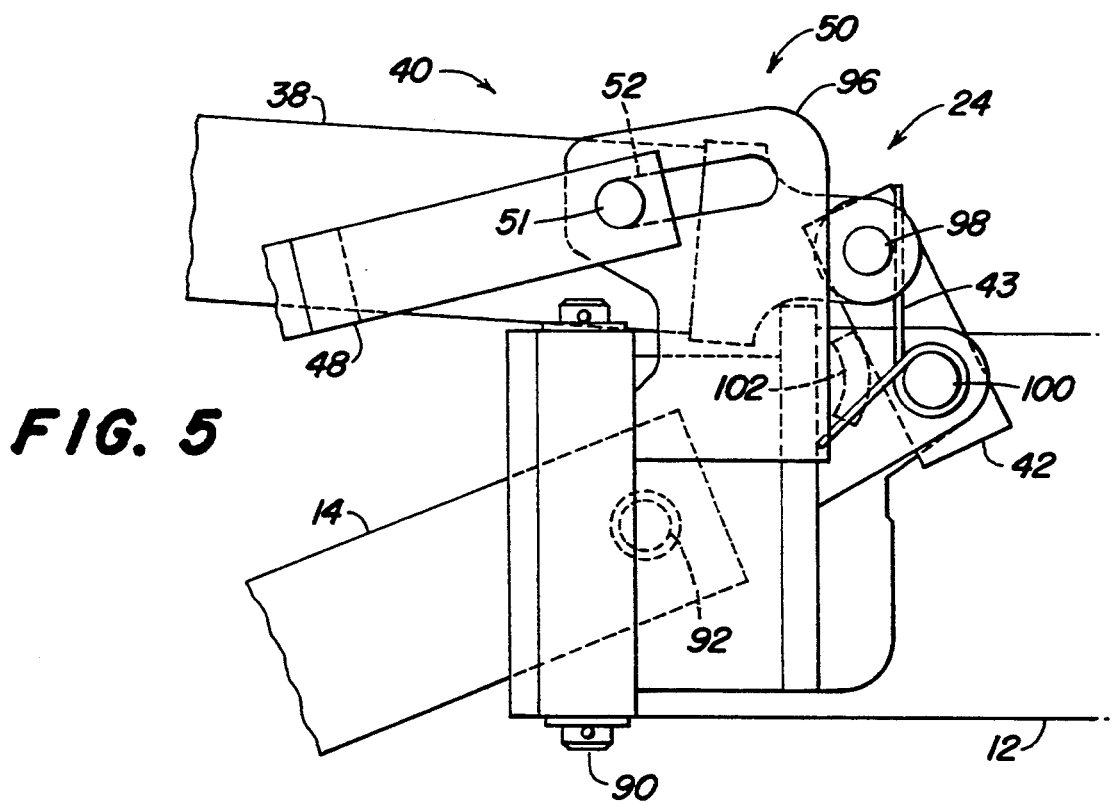
FIG. 5 is a partial front view of the winglet mounting bracket when the row marker is in its lowermost float position.

The torsion spring 43 biases the toggle link outwardly from the toolbar so that the toggle link is in its outboard position, illustrated in FIG. 5, when the row marker is fully retracted. The spring does not overcome the force of the hydraulic cylinder, however as the row marker is folded from its extended working position to its retracted transport position, the cylinder and the toggle link move from tension to compression members (the center of gravity of the marker goes over center). During this switchover the spring rotates the toggle link away from the toolbar into its outboard position for the remainder of the fold cycle. With the toggle link in this outboard position assured by the torsion spring, a smoother unfolded motion is achieved when the row marker is unfolded from its retracted transport position to its extended working position.

The first end 26 of the inner arm 16 is provided with a third bell crank 46. An inner control arm 48 is provided with a first end 50 having a pivot pin 51. The first end 50 is pivotally coupled to the toolbar by a float slot 52. The inner control arm 48 is provided with a second end 54 that is pivotally coupled to the third bell crank 46 at 56. The inner control arm 48 pivots the inner arm relative to the winglet when the hydraulic cylinder is extended or retracted and the inner control arm has reached the limit of the float range defined by the float slot.

Two pivot links 58 and 60 have first ends 62 and 64 that are pivotally coupled to the outer and inner arms 16 and 17, respectively. The pivot links 58 and 60 are also provided with second ends 66 and 68. An outer control arm 70 is provided with a first end 72 that is pivotally coupled to the second bell crank at 74, and a second end 76 that is pivotally coupled to the second ends 66 and 68 of pivot links 58 and 60 at 78. The outer control arm 70 pivots the outer arm relative to the inner arm when the hydraulic cylinder is extended or retracted.

Figure 2:
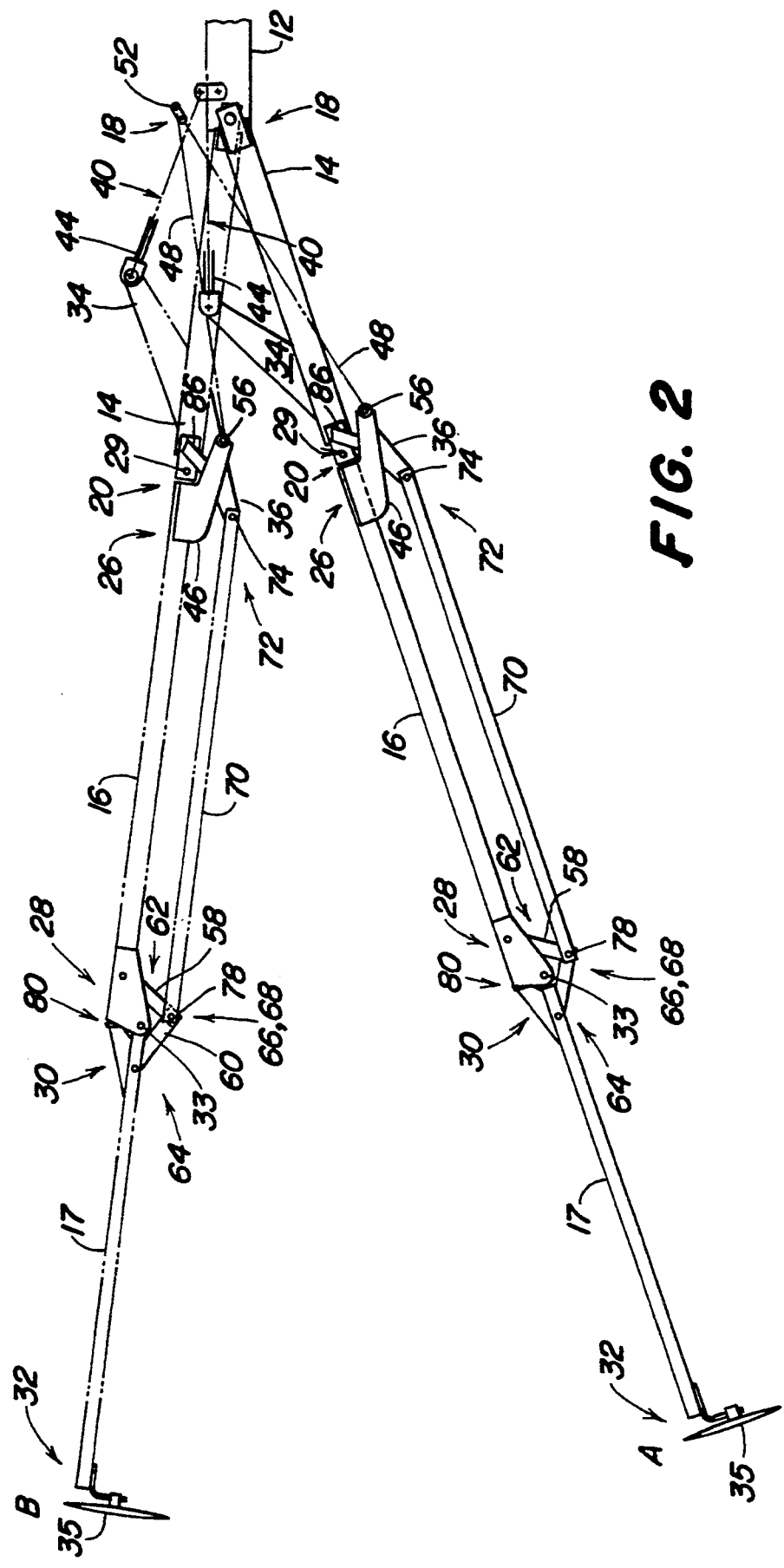
FIG. 2 is a front view of the present invention in it extended working position at the limits of its float range.

In its extended working position the row marker is allowed to float up and down to a limited degree so that the marker disc may follow the ground undulations. As shown in FIG. 2, position A marks the lowermost float position and position B marks the uppermost float position. Typically the row marker is positioned between these two extremes. The float range is dictated by the float slot and the toggle link. As the row marker floats up and down these two couplings allow for a range of lost motion in the system.

The inner and outer arms are locked in a rigid extended configuration by the outer stop 80. The outer stop comprises two plates that are welded to the inner and outer arms. Only outer arm stop plate 82 is shown in FIG. 3 as the stop plates are hidden by the flange forming the pivot 33. In its extended working position, the marker disc of the row marker contacts the ground forcing the outer arm upwardly. This upward force rotates the upper arm about pivot 68 forcing the outer arm plate against the inner arm plate.

The winglet is provided with inner stop 86. The inner stop comprises a plate that is welded to the winglet and extends therefrom so as to contact the topside of the third bell crank 46 when the winglet and the inner arm are axially aligned. The upward force of the ground against the marker disc drives the outer control arm to lock the inner arm against the inner stop 86.

When the row marker is retracted from its extended working position to its retracted transport position, the row marker stays in its rigid configuration until the upper float range is exceeded. After the upper limit of the float range has been exceeded, the inner arm is rotated relative to the winglet by the inner control arm, and the outer arm is rotated relative to the inner arm by the outer control arm, see position C in FIG. 3. These simultaneous movements continue until the row marker is in its fully retracted transport position, see position D in FIG. 3.

The winglet mounting bracket 24 is best illustrated in FIGS. 4 and 5. The mounting bracket to pinned to the toolbar by vertical pin 90. A horizontal bolt axially aligned with the toolbar further secures the mounting bracket to the toolbar. The horizontal bolt couples a toolbar ear to a mounting bracket ear. The horizontal bolt and the associated mounting ears are not shown, as they are on the other side of the mounting bracket. At a selected design tension, the horizontal bolt fails thereby providing breakaway protection for the marker.

The bracket is provided with horizontal pivot pin 92 that pivotally couples the winglet 14 to the bracket. The mounting bracket is also provided with vertically upstanding plate 96 in which float slot 52 is formed. The first end 50 of the inner control arm 48 is provided with a yoke which sandwiches the upstanding plate 96 therebetween. Float pivot pin is mounted to the yoke and passes through the float slot 52.

The base end of cylinder portion 38 of the hydraulic cylinder 40 is also provided with a yoke that sandwiches the toggle link 42 therebetween. Pivot pin 98 secures the toggle link to the hydraulic cylinder. The other end of the toggle link is pivotally coupled between two ears formed in the mounting bracket and pivotally secured thereto by pivot pin 100. A curved toggle link stop member 102 is located between the two ears. This stop member is designed to stop the rotation of the toggle link when the float pin 51 reaches the end of the float slot 52, as illustrated in FIGS. 4 and 5.

The tri-fold row marker of the present invention should not be limited by the above-described embodiments, but should be limited solely by the claims that follow.

What is claimed is:

1. A folding row marker for an agricultural implement, the row marker having an extended working position and a retracted storage position, the row marker comprising:

a winglet having a first end and a second end, the first end of the winglet being pivotally mounted to said agricultural implement;

an inner arm having a first end and a second end, the first end of the inner arm being pivotally mounted to the second end of the winglet;

an outer arm having a first end and a second end, the first end of the outer arm being pivotally mounted to the second end of the inner arm;

a surface marking means mounted on the second end of the outer arm for marking a surface when said row marker is its extended working position;

a first bell crank being mounted to the winglet and extending upwardly from the winglet;

a second bell crank being mounted to the winglet and extending downwardly from the winglet;

a third bell crank being mounted to the inner arm and extending downwardly from the inner arm;

a first pivot link having a first end and a second end, the first end being pivotally mounted to the inner arm;

a second pivot link having a first end and a second end, the first end being pivotally mounted to the outer arm;

a hydraulic cylinder having a first end and a second end, the first end of the hydraulic cylinder being pivotally coupled to said agricultural implement, the second end of the hydraulic cylinder being pivotally coupled to the first bell crank, the hydraulic cylinder having an extended position and a retracted position;

an inner control arm having a first end and a second end, the first end of the inner control arm being pivotally coupled to said agricultural implement, the second end of the inner control arm being pivotally coupled to the third bell crank;

an outer control arm having a first and second end, the first end of the outer control arm being pivotally coupled to the second bell crank, the second end of the outer control arm being pivotally coupled to the second ends of both the first and second pivot links;

whereby retracting the hydraulic cylinder from its extended position to its retracted position pivots the winglet relative to said agricultural implement, the inner arm relative to the winglet and the outer arm relative to the inner arm until the hydraulic cylinder is in its retracted transport position, in extending the hydraulic cylinder from its retracted transport position to its extended working position, the hydraulic cylinder pivots the winglet relative to said agricultural implement, the inner arm relative to the winglet and the outer arm relative to the inner arm until the hydraulic cylinder is in its extended position.

2. A row marker as defined by claim 1 wherein the inner control arm being pivotally coupled to said agricultural implement by a float slot that allows said row marker in its extended working position to float up and down to a limited degree.

3. A row marker as defined by claim 2 wherein the hydraulic cylinder being pivotally coupled to said agricultural implement by a toggle link that allows said row marker in its extended working position to float up and down to a limited degree.

4. A row marker as defined by claim 3 wherein the first end of the outer arm and the second end of the inner arm are provided with an outer stop, the outer stop holds the outer and inner arms rigid when the row marker is in its extended working position.

5. A row marker as defined by claim 4 wherein the second end of the winglet is provided with an inner stop that contacts the inner arm keeping the inner arm rigid with the winglet as the row marker is folded from its extended working position to its retracted transport position until the float range as defined by the float slot is exceeded.

* * * * *